United States Patent
Ide

(10) Patent No.: US 8,310,345 B2
(45) Date of Patent: Nov. 13, 2012

(54) RECEIVING APPARATUS

(75) Inventor: Daisuke Ide, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 619 days.

(21) Appl. No.: 12/434,049

(22) Filed: May 1, 2009

(65) Prior Publication Data

US 2009/0278704 A1     Nov. 12, 2009

(30) Foreign Application Priority Data

May 8, 2008   (JP) .................................. 2008-122524

(51) Int. Cl.
*H04Q 5/22* (2006.01)
(52) U.S. Cl. ...................... 340/10.4; 340/10.1; 340/10.2; 340/10.5; 340/10.6; 340/572.1; 340/572.2; 340/572.3; 340/572.4; 340/572.5; 340/572.6; 340/572.7; 340/572.8; 340/572.9
(58) Field of Classification Search .................. 340/10.4
See application file for complete search history.

(56) References Cited

U.S. PATENT DOCUMENTS

| | | | | |
|---|---|---|---|---|
| 5,847,662 | A * | 12/1998 | Yokota et al. | 340/10.34 |
| 6,491,230 | B1 * | 12/2002 | Dubost et al. | 235/492 |
| 6,650,229 | B1 * | 11/2003 | Wuidart et al. | 340/10.4 |
| 2002/0011922 | A1 * | 1/2002 | Wuidart | 340/10.4 |
| 2005/0162338 | A1 * | 7/2005 | Ikeda et al. | 345/2.1 |
| 2006/0267734 | A1 * | 11/2006 | Taki et al. | 340/10.4 |
| 2008/0112508 | A1 * | 5/2008 | Ishizaki et al. | 375/316 |

FOREIGN PATENT DOCUMENTS

| | | |
|---|---|---|
| JP | 2002-521758 | 7/2002 |
| JP | 2004-040788 | 2/2004 |
| JP | 2005-318385 | 11/2005 |
| JP | 2005-318386 | 11/2005 |
| JP | 2006-344228 | 12/2006 |
| JP | 2007-074153 | 3/2007 |

OTHER PUBLICATIONS

Japanese Office Action for Application No. 2008-122524 Mailed on Jun. 26, 2012.

* cited by examiner

*Primary Examiner* — George Bugg
*Assistant Examiner* — Anthony D Afrifa-Kyei
(74) *Attorney, Agent, or Firm* — Turocy & Watson, LLP

(57) ABSTRACT

In contactless communication in which a carrier wave transmitted from a first antenna of a host is received via a second antenna of a terminal and the carrier wave is amplitude-modulated on the terminal to transmit data to the host, a carrier wave detected from the first antenna is amplitude-demodulated to obtain a first demodulated output, and phase information included in the carrier wave detected from the first antenna is extracted and the extracted phase information is decoded to obtain a second demodulated output. Then, either of the first and second demodulated outputs is selected and output. Even when a null is caused by an antenna distance between a PCD and a PICC, demodulated data is reliably obtained by utilizing demodulation processing that uses phase information.

17 Claims, 4 Drawing Sheets

RECEIVING APPARATUS

CROSS REFERENCE TO RELATED APPLICATION

This application is based upon and claims the benefit of priority from the prior Japanese Patent Applications No. 2008-122524, filed in Japan on May 8, 2008; the entire contents of which are incorporated herein by reference.

BACKGROUND OF THE INVENTION

1. Field of the Invention

The present invention relates to a host-side receiving apparatus that performs contactless communication.

2. Description of Related Art

In recent years, portable information devices such as mobile phones, wireless tags, and contactless IC cards (hereinafter PICCs (Proximity Integrated Circuit Cards)) are gaining widespread use. By utilizing contactless communication capability of such information devices, electronic ticket gates for electronically examining tickets at stations or the like, electronic money, and so forth have been introduced.

As a terminal side of an information device performing contactless communication, a PICC is adopted, and a reader/writer (hereinafter PCD (Proximity Coupling Device)) is adopted as a host side, for example. In general, electric power used in a PICC is generated utilizing radiowave transmitted from a PCD. For example, an electromagnetic induction method may be adopted, where an AC voltage can be induced in the antenna coil of the PICC by bringing the PICC into an AC magnetic field which is generated by electric current supplied to an antenna coil of a PCD. The PICC is designed to convert the generated AC voltage to a DC voltage to drive its internal circuits.

The AC magnetic field generated in the PCD can be obtained by supplying a carrier wave of a predetermined frequency to the antenna coil of the PCD. By modulating the carrier wave, information can be transmitted from the PCD to the PICC. As a modulation method, amplitude shift keying modulation (ASK modulation) is adopted, for example.

Also, by changing load connected to a resonance circuit including the antenna coil of the PICC, for example, electric current that flows to antenna coils can be changed in the PCD side in which antenna coils are electromagnetically-coupled to each other. Load of the resonance circuit can be changed by switching a load switch. That is, load is changed with the load switch and amplitude of a carrier wave transmitted and received between the PCD and the PICC is changed so as to enable transmission of information from the PICC to the PCD.

By the way, the amplitude of a transmitted carrier wave changes also depending on a distance between the antenna coil of the PCD and the antenna coil of the PICC. The longer the distance, the carrier wave amplitude tends to become smaller. However, relation between the carrier wave amplitude and the distance differs between when the load switch is turned on and when the switch is off: for example, the carrier wave amplitude is affected less by the distance when the load switch is on than when it is off. Therefore, depending on the distance, magnitudes of carrier wave amplitudes of when the load switch is on and when the switch is off can change place with each other, and at a certain distance, the carrier wave amplitude of when the load switch is on and that of when the switch is off can agree with each other.

In such a condition, change in the carrier wave amplitude between when the load switch is on and when the switch is off becomes zero and information cannot be transmitted. To avoid occurrence of such a null, it is required to perform adjustment of the antenna, adjustment of tuning frequency, and the like. However, occurrence of a null cannot be avoided for all possible combinations of PCDs and PICCs just with such adjustments.

Japanese Patent Application Laid-Open Publication No. 2002-521758 discloses a technique that provides two receiving channels and selectively operates those receiving channels in accordance with selection criteria to enable contactless communication tolerant to interference. However, even the proposal of Japanese Patent Application Laid-Open Publication No. 2002-521758 cannot prevent a null that can be caused depending on the distance between antennas.

BRIEF SUMMARY OF THE INVENTION

A receiving apparatus according to an aspect of the present invention is, in contactless communication in which a carrier wave transmitted from a first antenna of a host is received via a second antenna of a terminal and the carrier wave is amplitude-modulated on the terminal to transmit data to the host, a receiving apparatus provided on the host for receiving the data, the receiving apparatus including: an amplitude demodulation section configured to amplitude-demodulate the carrier wave detected from the first antenna to output a first demodulated output; a phase information extraction section configured to extract phase information included in the carrier wave detected from the first antenna; a phase information demodulation section configured to demodulate the phase information extracted by the phase information extraction section to output a second demodulated output; and a selection section configured to select and output one of the first and second demodulated outputs from the amplitude demodulation section and the phase information demodulation section.

DETAILED DESCRIPTION OF THE INVENTION

Figure 1:
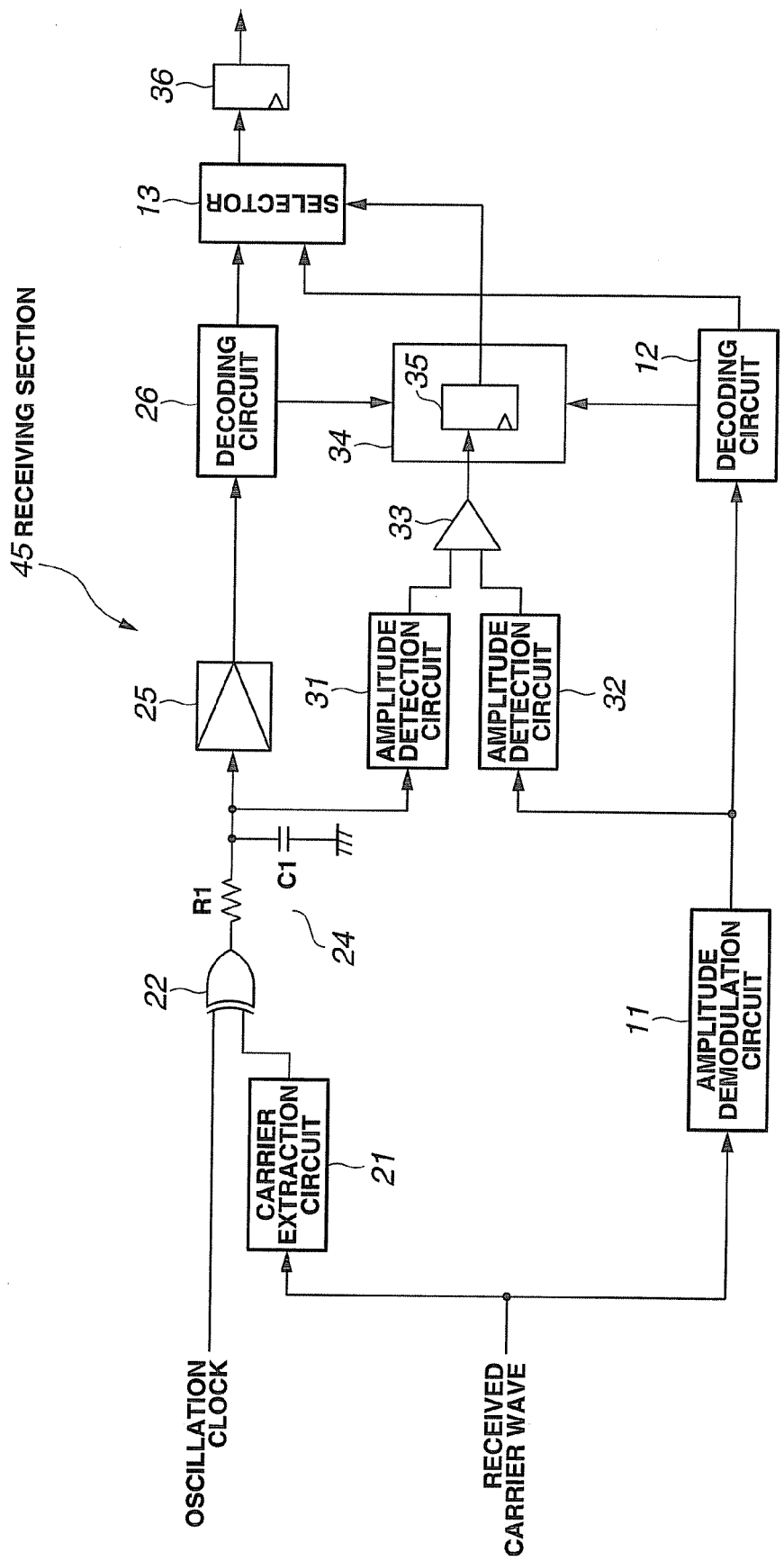
FIG. 1 is a circuit diagram showing a receiving apparatus according to an embodiment of the present invention.

Hereinafter, an embodiment of the present invention will be described in detail with reference to drawings. The present embodiment illustrates a case where a PCD is adopted as a host of an information device that performs contactless communication and a PICC is adopted as a terminal.

First, referring to FIG. 2, general configuration of the PCD and the PICC will be described. A PCD 41 and a PICC 51 have antennas 46 and 47, respectively, and can transmit information to each other via the antennas 46 and 47.

A control section 42 of the PCD 41 controls individual sections in the PCD 41. An oscillation section 43 generates a carrier wave of a predetermined frequency and outputs the carrier wave to a transmission section 44. The transmission section 44 is controlled by the control section 42 to supply the carrier wave to the antenna 46. As for data to be transmitted to the PICC 51, the control section 42 takes data from outside as input data and subjects the data to encoding processing. The control section 42 encodes the data for transmission by Non Return to Zero (NRZ) encoding, mirror encoding, Manchester encoding or the like.

The transmission section 44 is controlled by the control section 42 to modulate a carrier wave with data for transmission. As the modulation method, ASK modulation is adopted, for example. The transmission section 44 supplies the carrier wave modulated with the data for transmission to the antenna 46. Thus, from the antenna 46, only a carrier wave may be transmitted or a carrier wave modulated with data for transmission may be transmitted.

A control section 52 of the PICC 51 controls individual sections of the PICC 51. A power supply/receiving section 53 takes a signal induced in the antenna 57. The power supply/receiving section 53 converts an AC voltage which is generated in the antenna 57 by electromagnetic coupling, for example, of the antennas 46 and 57 to a DC voltage for use as power supply in the PICC 51. The power supply/receiving section 53 also demodulates an ASK-modulated carrier wave to take transmitted data before modulation and outputs the data to the control section 52. The control section 52 performs various types of processing based on the data received.

For example, the control section 52 reads data from memory 54 in response to the received data. The control section 52 applies encoding according to a predetermined method, e.g., Manchester encoding, to the data from the memory 54. The control section 52 controls turning on/off of the load switch 56 based on the Manchester-encoded data. The antenna 57 (including a resonance circuit not shown) is connected to a reference potential point via load 55 and the load switch 56. In response to turning on and off of the load switch 56, the load connected to the antenna 57 varies. Thereby, the amplitude of electric current that flows to the antenna 46 electromagnetically coupled to the antenna 57 changes.

A receiving section 45 of the PCD 41 extracts the carrier wave from the antenna 46. The amplitude of a carrier wave that appears in the antenna 46 changes in response to turning on and off of the load switch 56 of the PICC 51. The receiving section 45 can obtain data transmitted from the PICC 51 based on such change in the amplitude of a received carrier wave, and outputs the obtained data to the control section 42. The control section 42 outputs the data received at the receiving section 45 to outside as output data.

By the way, depending on the distance between the antennas 46 and 57, the amplitude of a carrier wave on the antenna 46 of when the load switch 56 is on may agree with that of when the switch 56 is off. In such a condition, transmitted data from the PICC 51 cannot be detected by detection of carrier wave amplitude.

In the present embodiment, therefore, demodulation is performed using not only carrier wave amplitude information but phase information. Data transmitted from the PICC 51 to the PCD 41 is subjected to ASK modulation, which changes carrier wave amplitude. In reality, however, when load connected to the antenna 57 is changed by turning off and on the load switch 56, not only the amplitude but phase of the carrier wave supplied to the antenna 46 of the PCD 41 changes. The present embodiment obtains data transmitted from the PICC 51 to the PCD 41 by detecting the phase.

Figure 3:
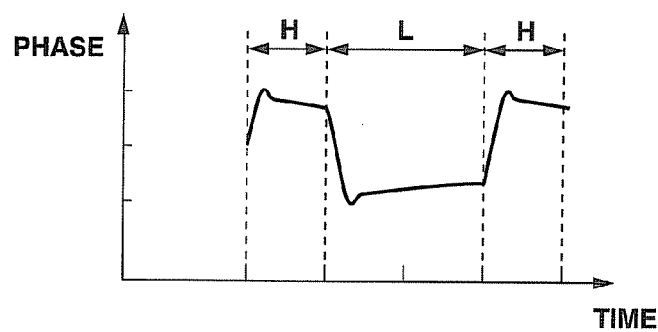
FIG. 3 is a waveform diagram showing change in phase of a received carrier wave, where a lateral axis represents time and a longitudinal axis represents phase.

FIG. 3 shows a waveform diagram showing change in phase of a received carrier wave, where the lateral axis represents time and the longitudinal axis represents phase.

In FIG. 3, a time period represented by H denotes a time period in which the amplitude of received carrier wave should be HI (H) by the load switch 56 being on and off, and the time period represented by L denotes a time period in which the amplitude of received carrier wave should be LO (L) by the load switch 56 being on and off. As shown in FIG. 3, phase leads, for example, in H time period in which the amplitude of received carrier wave should be H level, and phase lags, for example, in L time period in which the amplitude should be L level. Therefore, even when change in the amplitude of a received carrier wave cannot be detected, data represented by turning on and off of the load switch 56 can be detected by detecting phase of received carrier wave.

Figure 2:
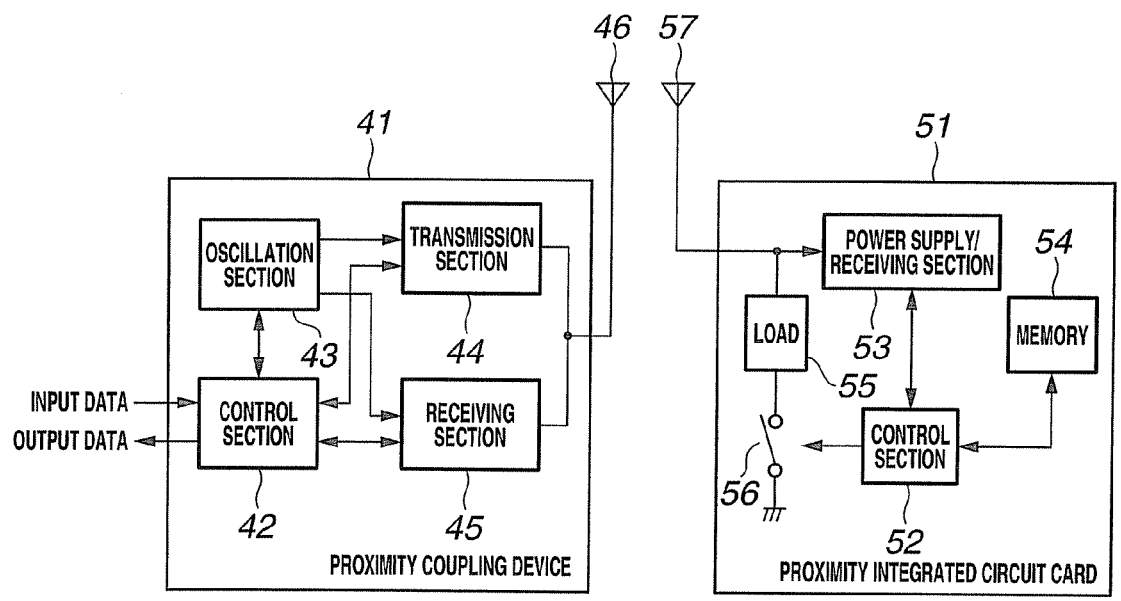
FIG. 2 is a circuit diagram showing schematic configurations of a PCD and a PICC.

FIG. 1 shows a specific configuration of the receiving section 45 of FIG. 2.

A received carrier wave from the antenna 46 is supplied to an amplitude demodulation circuit 11 and a carrier extraction circuit 21. The amplitude demodulation circuit 11 detects such change in the amplitude of a received demodulated wave as described above. The amplitude demodulation circuit 11 thereby obtains data that is based on turning on and off of the load switch 56. When Manchester encoding is applied to data on the PICC 51, output from the amplitude demodulation circuit 11 is a Manchester code. Output from the amplitude demodulation circuit 11 is supplied to a decoding circuit 12. The decoding circuit 12 decodes a code input thereto. Thereby, data before being subjected to Manchester encoding on the PICC 51 can be obtained. The decoding circuit 12 outputs data resulting from decoding to a selector 13.

Meanwhile, the carrier extraction circuit 21 extracts a carrier wave from the received carrier wave and outputs the carrier wave to exclusive or (EXOR) 22. The EXOR 22 is also provided with an oscillation clock of a carrier wave frequency of the oscillation section 43. The EXOR 22 determines an exclusive OR of two inputs and outputs the result of operation to a low-pass filter 24. The low-pass filter 24 is composed of a resistance R1 and a capacitor C1, and integrates output from the EXOR 22 and outputs the result to an amplifier 25.

Figure 4:
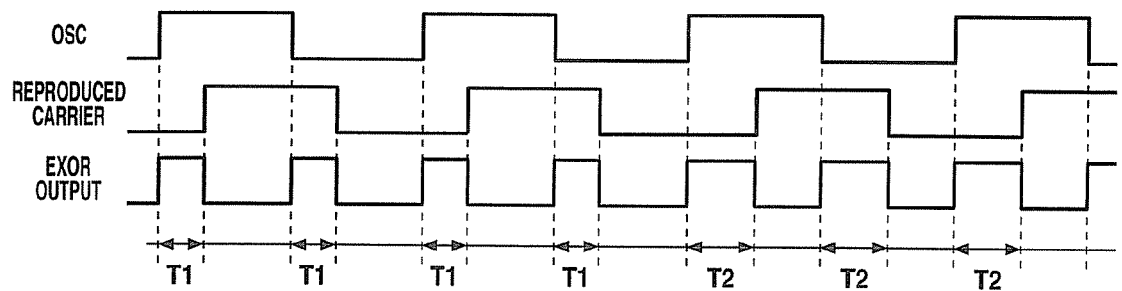
FIG. 4 is a waveform diagram showing oscillation clock (OSC) from an oscillation section 43, a carrier wave from a carrier extraction circuit 21 (a reproduced carrier), and output from EXOR 22.

FIG. 4 is a waveform diagram showing an oscillation clock (OSC) from the oscillation section 43, a carrier wave from the carrier extraction circuit 21 (a reproduced carrier), and output of the EXOR 22. Now, assume that for the oscillation clock from the oscillation section 43, such a reproduced carrier with its phase shifted as shown in FIG. 4 is obtained from the carrier extraction circuit 21. For example, a reproduced carrier with its phase delayed for time T1 represents a reproduced carrier of a time period in which the amplitude of the received carrier wave should be H level in response to turning on and off of the load switch 56. Meanwhile, a reproduced carrier with its phase delayed for time T2 represents a reproduced carrier of a time period in which the amplitude of received carrier wave should be L level in response to turning on and off of the load switch 56.

From the EXOR 22, pulses of duty cycles corresponding to the phase delay times T1 and T2 are obtained. Accordingly, by integrating the output of the EXOR 22, a waveform having an amplitude commensurate with change in phase can be obtained as shown in FIG. 3. The low-pass filter 24 obtains a phase detection output of an amplitude commensurate with change in phase of the received carrier wave that is based on turning on and off of the load switch 56. The phase detection output is given to the amplifier 25.

The amplifier 25 amplifies the phase detection output and outputs it to the decoding circuit 26. The phase detection output is data that is based on turning on and off of the load switch 56 and is a Manchester code like output from the amplitude demodulation circuit 11 when the data has been subjected to Manchester encoding on the PICC 51. The decoding circuit 26 reconstructs original data through decoding process similar to one performed by the decoding circuit 12. Output from the decoding circuit 26 is supplied to the selector 13.

Thus, in the present embodiment, decoded data based on amplitude demodulation processing is obtained from the decoding circuit 12 and decoded data based on a result of phase information detection is obtained from the decoding circuit 26. In the present embodiment, the selector 13 selects either one of outputs from the decoding circuit 12 or 26 according to a control signal from a determination section 34 discussed below and outputs the output to a flip flop 36. The flip flop 36 outputs the output from the selector 13 to the control section 42 at a predetermined timing.

For determination at the determination section 34, amplitude detection circuits 31 and 32 are provided. The amplitude detection circuit 31 detects the amplitude of output from the demodulation circuit 11 and outputs it to a comparator 33, and the amplitude detection circuit 32 detects the amplitude of output from the low-pass filter 24 and outputs the amplitude to the comparator 33. The comparator 33 determines which of the two inputs is larger and outputs the result of determination to the determination section 34. The result of determination from the comparator 33 shows which of the amplitude of output from the amplitude demodulation circuit 11 and that of output from the low-pass filter 24 is larger.

Figure 5:
FIG. 5 illustrates an example of data formats of data transmitted and received between a PCD 41 and a PICC 51.

To the determination section 34, synchronization detection results are given from the decoding circuits 12 and 26. FIG. 5 shows an example of data formats of data transmitted and received between the PCD 41 and the PICC 51. In the example of FIG. 5, a preamble is provided at a beginning of transmitted/received data, which is followed by code SYNC for synchronization detection, data length, and data and error detection code CRC. The decoding circuits 12 and 26 are designed to output a synchronization detection result indicating detection of synchronization to the determination section 34 upon detection of the code SYNC for synchronization detection included in data.

In an initial state, the determination section 34 outputs a control signal based on a determination result for selecting output of the decoding circuit 26, to the selector 13. When a detection result showing detection of synchronization is given either one of the decoding circuits 12 and 26, the determination section 34 outputs a control signal for selecting output of that decoding circuit to the selector 13. When a detection result indicating detection of synchronization is given from both of the decoding circuits 12 and 26, the determination section 34 outputs a control signal based on output from the comparator 33 to the selector 13.

The determination section 34 has a flip flop 35, and is designed to output a determination result based on output from the comparator 33 at a time immediately after detection of synchronization by driving the flip flop 35 with a detection result indicating detection of code SYNC for synchronization detection.

Furthermore, the determination section 34 may also decide which of outputs from the decoding circuits 12 and 26 to select based on a correctness rate of decoding results. The decoding circuits 12 and 26 can determine the correctness rate through error correction processing. By the decoding circuits 12 and 26 giving correctness rate information to the determination section 34, the determination section 34 outputs a control signal to the selector 13 so that a decoded output with less errors and a higher correctness rate is selected.

Figure 6:
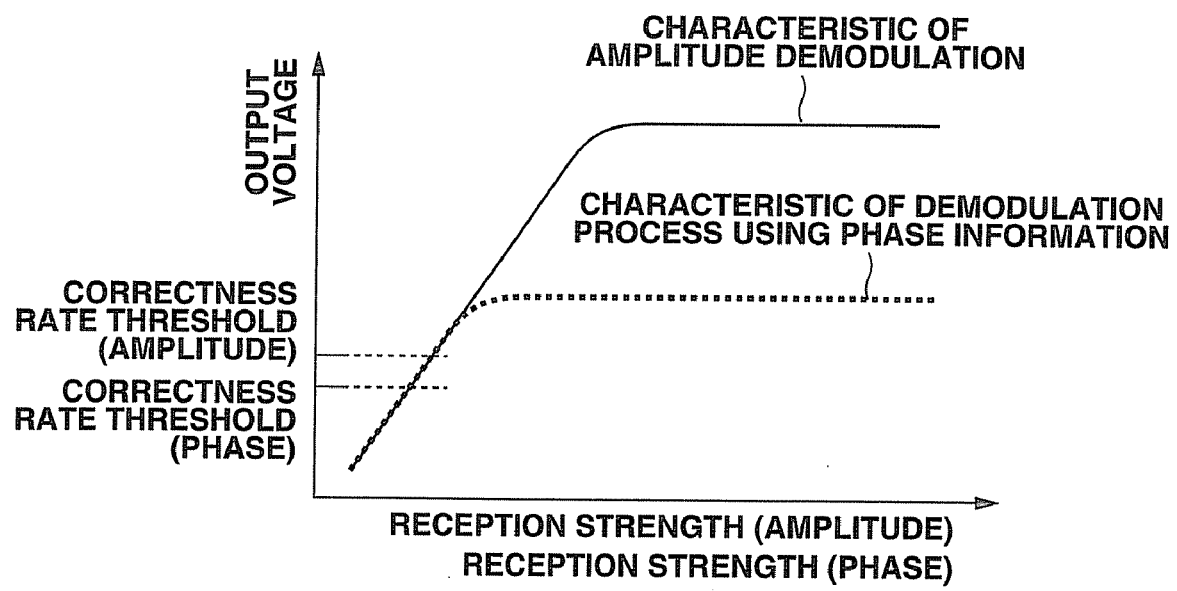
FIG. 6 is a graph for illustrating determination by a determination section 34, where the lateral axis represents reception strength in terms of amplitude and phase and the longitudinal axis represents output voltage of amplitude detection circuits 31 and 32.

Next, operation of the embodiment thus configured is described with reference to FIG. 6. FIG. 6 is a graph for illustrating determination by the determination section 34, where the lateral axis represents reception strength in terms of amplitude and phase and the longitudinal axis represents output voltage from the amplitude detection circuits 31 and 32.

A received carrier wave from the antenna 46 is given to the amplitude demodulation circuit 11 and the carrier extraction circuit 21. The amplitude demodulation circuit 11 obtains a Manchester code through demodulation processing based on the amplitude of the received carrier wave. Output from the amplitude demodulation circuit 11 is given to the decoding circuit 12.

Meanwhile, the carrier extraction circuit 21 reproduces a carrier wave from the received signal and outputs the reproduced carrier to the EXOR 22. The EXOR 22 outputs a pulse of a duty cycle corresponding to shift of phase of the reproduced carrier by an exclusive OR operation on the oscillation clock from the oscillation section 43 and the reproduced carrier. The duty cycle of the output pulse from the EXOR 22 changes in accordance with turning on and off of the load switch 56 of the PICC 51. Output from the EXOR 22 is given to the low-pass filter 24 to be integrated, and a signal of a level commensurate with the phase of the reproduced carrier is output from the low-pass filter 24.

The output from the low-pass filter 24 is of a level corresponding to turning on or off of the load switch 56, indicative of a Manchester code transmitted. The output from the low-pass filter 24 is amplified by the amplifier 25 and then output to the decoding circuit 26.

The decoding circuit 12 decodes the Manchester code which is based on amplitude demodulation to reconstruct original data, and outputs the data to the selector 13. The decoding circuit 26 decodes the Manchester code which is based on demodulation using phase information to reconstruct original data, and outputs the data to the selector 13.

Output of the amplitude demodulation circuit 11 is also given to the amplitude detection circuit 32, in which the amplitude of the amplitude-demodulated output is detected. Output from the low-pass filter 24 is also given to the amplitude detection circuit 31, in which the amplitude of demodulated output that is based on demodulation using phase information is detected. The results of amplitude detection by the amplitude detection circuits 31 and 32 are compared by the comparator 33, and a comparison result showing which of the amplitudes is larger is output from the comparator 33 to the determination section 34.

In the initial state, the determination section 34 outputs a control signal for selecting the decoding result of the decoding circuit 26 to the selector 13. Thereby, in the initial state, output from the decoding circuit 26 is output from the selector 13 via the flip flop 36. As a result, even when the distance between the antennas 46 and 57 causes a null, transmitted data from the PICC 51 can be received and decoded based on phase information.

Upon detection of code SYNC for synchronization detection shown in FIG. 5, the decoding circuits 12 and 26 output detection results to the determination section 34. When given a result that the code SYNC for synchronization detection was detected, the determination section 34 controls the selector 13 so that the selector 13 selects output from the detected decoding circuit.

When given a detection result that shows code SYNC for synchronization detection was detected from both the decoding circuits 12 and 26, the determination section 34 obtains a determination result based on output from the comparator 33. That is, in this case, the determination section 34 outputs a control signal to the selector 13 so that the selector 13 adopts a demodulated output having a larger amplitude as a result of comparing the amplitude of amplitude-demodulated output with the amplitude of demodulated output which is based on demodulation processing using phase information. In this case, a control signal for the selector 13 is output from the flip flop 35 upon generation of detection results from the decoding circuits 12 and 26. As a result, a determination result at a timing relatively close to a timing of data transmission is utilized as shown in FIG. 5, enabling highly reliable data transmission e.g., even when the distance between the antennas 46 and 57 continuously changes.

By the way, since a received carrier wave is basically amplitude-modulated, amplitude demodulation is considered to have higher reliability of demodulation processing than demodulation processing that uses phase information. Therefore, in a normal usage condition, amplitude demodulation may be preferentially adopted by making settings such that the amplitude of amplitude-demodulated output is of a larger level than the amplitude of demodulated output which is based on demodulation using phase information, and a sufficient correctness rate can be obtained by means of demodulation using phase information even when a sufficient correctness rate cannot be obtained with amplitude-demodulated output.

FIG. 6 shows settings in such a case. In FIG. 6, a solid line represents characteristics of amplitude demodulation and a broken line represents characteristics of demodulation using phase information. The example of FIG. 6 shows that, for a reception strength at a certain level or higher, output from the amplitude detection circuit 32 corresponding to amplitude demodulation is always greater than output from the amplitude detection circuit 31 corresponding to a demodulation result using phase information. In other words, the figure shows that when there is a reception strength at a certain level or higher for amplitude and phase, demodulated and decoded outputs based on amplitude demodulation are always selected by the determination section 34.

A correctness rate threshold indicates output voltage of the amplitude detection circuits 31 and 32 of when a correctness rate of 100% is obtained in an error correction process in the decoding circuits 12 and 26. In the example of FIG. 6, to obtain a correctness rate of 100%, it is required that the output voltage of the amplitude detection circuit 32 is higher than that of the amplitude detection circuit 31.

By making the settings of FIG. 6, demodulated and decoded outputs that are based on demodulation processing using phase information are selected only when change in amplitude of the carrier wave is so small that decoding is difficult. In addition, a correctness rate of 100% is easy to be obtained in demodulation processing using phase information, enabling reliable reception regardless of reception strength.

As described, in the present embodiment, amplitude demodulation processing and demodulation processing using phase information are performed for a received carrier wave that is amplitude-modulated, and which way of demodulation processing to select is determined by comparing output amplitudes of those ways of demodulation processing. Consequently, decoded data can be obtained through demodulation processing using phase information even when a null is caused by the antenna distance between the PCD and the PICC and demodulation processing that provides more reliable decoded data is selected, which enables data reception always in good condition.

The present invention is not limited to the above-described embodiment and is subject to various modifications. By way of example, the present invention is applicable to a mobile phone having contactless communication capability as a terminal.

Having described the preferred embodiments of the invention referring to the accompanying drawings, it should be understood that the present invention is not limited to those precise embodiments are various changes and modifications thereof could be made by one skilled in the art without departing from the spirit or scope of the invention as defined in the appended claims.

What is claimed is:

1. In contactless communication in which a carrier wave transmitted from a first antenna of a host is received via a second antenna of a terminal and the carrier wave is amplitude-modulated on the terminal to transmit data to the host, a receiving apparatus provided on the host for receiving the data, the receiving apparatus comprising:
   an amplitude demodulation section configured to amplitude-demodulate the carrier wave detected from the first antenna to output a first demodulated output;
   a phase information extraction section configured to extract phase information included in the carrier wave detected from the first antenna;
   a phase information demodulation section configured to demodulate the phase information extracted by the phase information extraction section to output a second demodulated output; and
   a selection section configured to select and output one of the first and second demodulated outputs from the amplitude demodulation section and the phase information demodulation section,
   wherein the phase information extraction section comprises:
     a carrier extraction section configured to reproduce the carrier wave from a received signal on the first antenna to output a reproduced carrier; and
     an exclusive logical sum operation section configured to obtain phase information included in the carrier wave by an exclusive logical sum operation on a carrier wave generated by the host for supply to the first antenna and the reproduced carrier.

2. The receiving apparatus according to claim 1, wherein the terminal amplitude-modulates the carrier wave by turning on and off a load switch connected to the second antenna.

3. The receiving apparatus according to claim 1, wherein the terminal comprises:
   a power supply section configured to generate a DC supply voltage based on an AC voltage generated in the second antenna;
   a receiving section configured to demodulate the carrier wave received on the second antenna to obtain transmitted data from the host;
   a load switch connected to the second antenna; and
   a control section configured to turn on and off the load switch connected to the second antenna based on the transmitted data obtained by the receiving section to amplitude-modulate the carrier wave.

4. The receiving apparatus according to claim 1, wherein the terminal modulates the carrier wave by amplitude shift keying to transmit data to the host.

5. The receiving apparatus according to claim 1, wherein the terminal encodes data to be transmitted to the host.

6. The receiving apparatus according to claim 1, wherein the phase information demodulation section comprises a low-pass filter configured to integrate an operation result from the exclusive logical sum operation section to obtain the second demodulated output.

7. The receiving apparatus according to claim 1, further comprising an amplitude detection section configured to detect amplitudes of the first and second demodulated outputs from the amplitude demodulation section and the phase information demodulation section.

8. The receiving apparatus according to claim 7, wherein the selection section selects and outputs one of the first and second demodulated outputs from the amplitude demodulation section and the phase information demodulation section based on a detection result from the amplitude detection section.

9. The receiving apparatus according to claim 7, wherein the selection section,
   in an initial state, selects and outputs the second demodulated output from the phase information demodulation section, and
   upon detection of a synchronization signal from the first and second demodulated outputs from the amplitude demodulation section and the phase information demodulation section, makes selection based on a detection result from the amplitude detection section.

10. The receiving apparatus according to claim 7, wherein if a synchronization signal has been detected from one of the first and second demodulated outputs from the amplitude demodulation section and the phase information demodulation section, the selection section selects a demodulated output from which the synchronization signal has been detected regardless of the detection result from the amplitude detection section.

11. The receiving apparatus according to claim 7, wherein when the amplitude of the first demodulated output from the amplitude demodulation section detected by the amplitude detection section is a predetermined amplitude or greater, the selection section selects the first demodulated output from the amplitude demodulation section.

12. The receiving apparatus according to claim 5, further comprising:
   an amplitude detection section configured to detect the amplitudes of the first and second demodulated outputs from the amplitude demodulation section and the phase information demodulation section; and
   first and second decoding sections configured to decode the first and second demodulated outputs from the amplitude demodulation section and the phase information demodulation section, respectively, to output decoded outputs.

13. The receiving apparatus according to claim 12, wherein the selection section selects and outputs one of the first and second decoded outputs from the first and second decoding sections based on a detection result from the amplitude detection section.

14. The receiving apparatus according to claim 12, wherein the selection section,
   in an initial state, selects and outputs the second decoded output from the second decoding section, and
   upon detection of a synchronization signal from the first and second decoded outputs from the first and second decoding sections, makes selection based on the detection result from the amplitude detection section.

15. The receiving apparatus according to claim 12, wherein if a synchronization signal has been detected from one of the first and second decoded outputs from the first and second decoding sections, the selection section selects a decoded output from which the synchronization signal has been detected regardless of the detection result from the amplitude detection section.

16. The receiving apparatus according to claim 12, wherein when the amplitude of the first demodulated output from the amplitude demodulation section detected by the amplitude detection section is a predetermined amplitude or greater, the selection section selects the first decoded output from the first decoding section.

17. The receiving apparatus according to claim 12, wherein the selection section selects one of the first and second decoded outputs that has less errors in an error correction process by the first and second decoding sections.

* * * * *